United States Patent
Ikarashi et al.

(10) Patent No.: US 11,456,862 B2
(45) Date of Patent: Sep. 27, 2022

(54) SECURE COMPUTATION SYSTEM, SECURE COMPUTATION APPARATUS, SECURE COMPUTATION METHOD, AND RECORDING MEDIUM

(71) Applicant: NIPPON TELEGRAPH AND TELEPHONE CORPORATION, Chiyoda-ku (JP)

(72) Inventors: Dai Ikarashi, Musashino (JP); Koji Chida, Musashino (JP); Ryo Kikuchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 309 days.

(21) Appl. No.: 16/624,101

(22) PCT Filed: Jun. 28, 2018

(86) PCT No.: PCT/JP2018/024588
§ 371 (c)(1),
(2) Date: Dec. 18, 2019

(87) PCT Pub. No.: WO2019/009180
PCT Pub. Date: Jan. 10, 2019

(65) Prior Publication Data
US 2020/0213097 A1 Jul. 2, 2020

(30) Foreign Application Priority Data
Jul. 5, 2017 (JP) .............................. JP2017-132034

(51) Int. Cl.
*H04L 9/08* (2006.01)
*G09C 1/00* (2006.01)

(52) U.S. Cl.
CPC ................ *H04L 9/085* (2013.01); *G09C 1/00* (2013.01); *H04L 9/0861* (2013.01); *H04L 2209/12* (2013.01); *H04L 2209/46* (2013.01)

(58) Field of Classification Search
CPC ... H04L 9/085; H04L 9/0861; H04L 2209/12; H04L 2209/46; H04L 9/008;
(Continued)

(56) References Cited

U.S. PATENT DOCUMENTS 8,085,938 B2 * 12/2011 Kagaya ................... H04L 9/085
713/168
8,719,573 B2 * 5/2014 Ran ........................ H04L 9/0861
713/170

(Continued)

FOREIGN PATENT DOCUMENTS

JP 6006842 B1 10/2016

OTHER PUBLICATIONS

Kikuchi et al., Secret Sharing with Share-Conversion: Achieving Small Share-Size and Extendibility to Multiparty Computation, IEICE Trans. Fundamentals, vol. E98-A, No. 1 Jan. 2015.*

(Continued)

*Primary Examiner* — David Garcia Cervetti
(74) *Attorney, Agent, or Firm* — Oblon, McClelland, Maier & Neustadt, L.L.P.

(57) ABSTRACT

$P_i$ and $P_+$ have stored $a_+ \in \{a_0, a_1, a_2\}$ and $b_+ \in \{b_0, b_1, b_2\}$ therein, and $P_i$ and $P_-$ have stored $a_- \in A_-$ and $b_- \in B_-$ therein. Here, $P_+ = P_{(i+1) \mod 3}$, $P_- = P_{(i-1) \mod 3}$, and $a$ and $b$ are arbitrary values and satisfy $a = a_0 + a_1 + a_2$ and $b = b_0 + b_1 + b_2$, where $A_-$ is a complement of $a_+$ in $\{a_0, a_1, a_2\}$ and $B_-$ is a complement of $b_+$ in $\{b_0, b_1, b_2\}$. $P_i$ and $P_+$ share $r_+$, $P_i$ and $P_-$ share $r_-$, and $P_i$ calculates $c_+ = (a_+ + a_-)(b_+ + b_-) - a_- b_- + r_+ - r_-$. $P_i$ sends $c_+$ to $P_+$.

8 Claims, 6 Drawing Sheets

(58) Field of Classification Search
CPC ..... H04L 9/3066; H04L 9/0841; H04L 9/088; H04L 9/302; H04L 9/0844; G09C 1/00; G06F 7/5443; G06F 7/523
See application file for complete search history.

(56) References Cited

U.S. PATENT DOCUMENTS

| | | | | |
|---|---|---|---|---|
| 9,202,076 | B1* | 12/2015 | Chazin | G06F 21/6218 |
| 9,449,177 | B1* | 9/2016 | El Defrawy | G06F 21/60 |
| 9,768,953 | B2* | 9/2017 | Bernat | H04L 9/085 |
| 10,116,439 | B2* | 10/2018 | Koike | H04L 9/0816 |
| 10,657,847 | B2* | 5/2020 | Hamada | G09C 1/00 |
| 10,721,063 | B2* | 7/2020 | Furukawa | H04L 9/085 |
| 10,972,271 | B2* | 4/2021 | Hamada | H04L 9/32 |
| 11,128,452 | B2* | 9/2021 | Vaněk | H04L 9/3066 |
| 11,200,346 | B2* | 12/2021 | Hamada | G06F 21/72 |
| 2004/0179686 | A1* | 9/2004 | Matsumura | H04L 9/085 380/44 |
| 2008/0022091 | A1* | 1/2008 | Deshpande | H04L 63/061 713/157 |
| 2008/0162646 | A1* | 7/2008 | Pizano | H04L 51/212 726/4 |
| 2008/0205637 | A1* | 8/2008 | Kurihara | H04L 9/085 380/28 |
| 2008/0232580 | A1* | 9/2008 | Hosaka | H04L 9/085 380/28 |
| 2010/0054480 | A1* | 3/2010 | Schneider | H04L 9/085 380/283 |
| 2010/0205443 | A1* | 8/2010 | Zhao | H04L 9/0841 713/171 |
| 2010/0215172 | A1* | 8/2010 | Schneider | H04L 9/085 713/171 |
| 2012/0290830 | A1* | 11/2012 | Resch | H04L 9/3093 713/150 |
| 2013/0114815 | A1* | 5/2013 | Nishimaki | H04L 9/3073 380/278 |
| 2013/0182836 | A1* | 7/2013 | Hamada | H04L 9/0891 380/28 |
| 2013/0272521 | A1* | 10/2013 | Kipnis | H04L 9/0816 380/44 |
| 2013/0304780 | A1* | 11/2013 | Ikarashi | H04L 9/085 708/250 |
| 2013/0339728 | A1* | 12/2013 | Ikarashi | H04L 9/008 713/164 |
| 2014/0173270 | A1* | 6/2014 | Matsuo | H04L 9/085 713/150 |
| 2014/0177825 | A1* | 6/2014 | Mattsson | H04L 9/06 380/28 |
| 2015/0213079 | A1* | 7/2015 | Shukla | G06F 16/2365 707/687 |
| 2015/0372811 | A1* | 12/2015 | Le Saint | H04L 63/0823 705/76 |
| 2016/0087792 | A1* | 3/2016 | Smith | H04L 9/0836 380/278 |
| 2016/0210472 | A1* | 7/2016 | Ikarashi | G06F 21/64 |
| 2016/0335440 | A1* | 11/2016 | Clark | H04L 9/085 |
| 2017/0149740 | A1* | 5/2017 | Mansour | H04L 63/045 |
| 2017/0228547 | A1* | 8/2017 | Smith | H04L 63/0428 |
| 2017/0310473 | A1* | 10/2017 | Takiguchi | H04L 9/085 |
| 2017/0365192 | A1* | 12/2017 | Ikarashi | G09C 1/00 |
| 2018/0011996 | A1* | 1/2018 | Dolev | G06F 21/14 |
| 2018/0048625 | A1* | 2/2018 | Teranishi | H04L 9/088 |
| 2018/0053442 | A1* | 2/2018 | Ikarashi | H04L 9/085 |
| 2018/0115415 | A1* | 4/2018 | Teranishi | G06F 21/602 |
| 2018/0123780 | A1* | 5/2018 | Ikarashi | H04L 9/085 |
| 2018/0139045 | A1* | 5/2018 | Furukawa | H04L 9/0861 |
| 2018/0205707 | A1* | 7/2018 | Bellala | H04L 9/085 |
| 2018/0218650 | A1* | 8/2018 | Ikarashi | H04L 9/12 |
| 2018/0225431 | A1* | 8/2018 | Ikarashi | G06F 21/30 |
| 2018/0375663 | A1* | 12/2018 | Le Saint | H04L 63/0823 |
| 2019/0014094 | A1* | 1/2019 | Le Saint | H04L 63/0428 |
| 2019/0044697 | A1* | 2/2019 | Paz de Araujo | H04L 63/0428 |
| 2019/0109701 | A1* | 4/2019 | Paz de Araujo | H04L 9/0841 |
| 2019/0141051 | A1* | 5/2019 | Ikarashi | H04L 63/00 |
| 2019/0156705 | A1* | 5/2019 | Hamada | H04L 63/0428 |
| 2019/0163933 | A1* | 5/2019 | Hamada | G09C 1/00 |
| 2019/0212986 | A1* | 7/2019 | Araki | G06F 7/4824 |
| 2019/0229904 | A1* | 7/2019 | Hamada | G06F 21/602 |
| 2019/0266326 | A1* | 8/2019 | Furukawa | G06F 7/523 |
| 2019/0310829 | A1* | 10/2019 | Hamada | G09C 1/00 |
| 2019/0333415 | A1* | 10/2019 | Hamada | H04L 9/36 |
| 2019/0349193 | A1* | 11/2019 | Ikarashi | H04L 9/085 |
| 2020/0125724 | A1* | 4/2020 | Ikarashi | H04L 9/002 |
| 2020/0242466 | A1* | 7/2020 | Mohassel | H04L 9/008 |
| 2021/0082319 | A1* | 3/2021 | Araki | G06F 7/523 |
| 2021/0157955 | A1* | 5/2021 | Araki | G09C 1/00 |
| 2021/0334099 | A1* | 10/2021 | Araki | G06F 9/544 |
| 2021/0334100 | A1* | 10/2021 | Ishizaka | H04L 9/085 |

OTHER PUBLICATIONS

Mohassel et al., Fast and Secure Three-party Computation: The Garbled Circuit Approach, ACM, Oct. 2015.*
International Search Report dated Oct. 2, 2018 in PCT/JP2018/024588 filed on Jun. 28, 2018.

* cited by examiner

US 11,456,862 B2

SECURE COMPUTATION SYSTEM, SECURE COMPUTATION APPARATUS, SECURE COMPUTATION METHOD, AND RECORDING MEDIUM

TECHNICAL FIELD

The present invention relates to the field of cryptographic techniques, and more particularly to the field of secure computation techniques.

BACKGROUND ART

In some schemes, values are exchanged among multiple secure computation apparatuses and each secure computation apparatus performs secure computation such as secure multiplication or secure multiply-accumulate using values received from other secure computation apparatuses (see Patent Literature 1, for instance).

PRIOR ART LITERATURE

Patent Literature

Patent Literature 1: Japanese Registered Patent No. 6006842

SUMMARY OF THE INVENTION

Problems to be Solved by the Invention

The scheme described in Patent Literature 1, however, has the disadvantage of involving a large number of additions/subtractions and multiplications and a large number of memory accesses.

An object of the present invention is to provide techniques for performing secure multiplication or secure multiply-accumulate with a less number of additions/subtractions and multiplications and a less number of memory accesses than conventional techniques.

Means to Solve the Problems

The secure multiplication according to the present invention is performed in the following manner. A storage of a secure computation apparatus $P_i$ and a storage of a secure computation apparatus $P_+$ have stored therein subshares $a_+ \in \{a_0, a_1, a_2\}$ and $b_+ \in \{b_0, b_1, b_2\}$, and the storage of the secure computation apparatus $P_i$ and a storage of a secure computation apparatus $P_-$ have stored therein subshares $a_- \in A_-$ and $b_- \in B_-$. Here, $i \in \{0, 1, 2\}$ holds; $P_+$ is $P_{(i+1) \bmod 3}$; $P_-$ is $P_{(i-1) \bmod 3}$; a and b are arbitrary values; $a_0$, $a_1$, and $a_2$ are subshares satisfying $a = a_0 + a_1 + a_2$; $b_0$, $b_1$, and $b_2$ are subshares satisfying $b = b_0 + b_1 + b_2$; $A_-$ is a complement of $a_+$ in $\{a_0, a_1, a_2\}$; and a is a complement of $b_+$ in $\{b_0, b_1, b_2\}$. A sharing unit of the secure computation apparatus $P_i$ and a sharing unit of the secure computation apparatus $P_+$ share an arbitrary value $r_+$, and the sharing unit of the secure computation apparatus $P_i$ and a sharing unit of the secure computation apparatus $P_-$ share an arbitrary value $r_-$, and an arithmetic unit of the secure computation apparatus $P_i$ calculates $c_+ = (a_+ + a_-)(b_+ + b_-) - a_- b_- + r_+ - r_-$. An output unit of each secure computation apparatus $P_i$ outputs $c_+$ to the secure computation apparatus $P_+$, and $c_+$ is input to an input unit of the secure computation apparatus $P_+$.

The secure multiply-accumulate according to the present invention is performed in the following manner. A storage of a secure computation apparatus $P_i$ and a storage of a secure computation apparatus $P_+$ have stored therein subshares $a_+(n) \in \{a_0(n), a_1(n), a_2(n)\}$ and $b_+(n) \in \{b_0(n), b_1(n), b_2(n)\}$, and the storage of the secure computation apparatus $P_i$ and a storage of a secure computation apparatus $P_-$ have stored therein subshares $a_-(n) \in A_-(n)$ and $b_-(n) \in B_-(n)$. Here, $i \in \{0, 1, 2\}$ holds; $P_+$ is $P_{(i+1) \bmod 3}$; $P_-$ is $P_{(i-1) \bmod 3}$; a(n) and b(n) are arbitrary values; $a_0(n)$, $a_1(n)$, and $a_2(n)$ are subshares satisfying $a(n) = a_0(n) + a_1(n) + a_2(n)$; $b_0(n)$, $b_1(n)$, and $b_2(n)$ are subshares satisfying $b(n) = b_0(n) + b_1(n) + b_2(n)$; N is a positive integer, where $n = 0, \ldots, N-1$; $A_-(n)$ is a complement of $a_+(n)$ in $\{a_0(n), a_1(n), a_2(n)\}$; and $B_-(n)$ is a complement of $b_+(n)$ in $\{b_0(n), b_1(n), b_2(n)\}$. A sharing unit of the secure computation apparatus $P_i$ and a sharing unit of the secure computation apparatus $P_+$ share an arbitrary value $r_+$, the sharing unit of the secure computation apparatus $P_i$ and a sharing unit of the secure computation apparatus $P_-$ share an arbitrary value $r_-$, and an arithmetic unit of the secure computation apparatus $P_i$ calculates:

$$c_+ = \sum_{n=0}^{N-1} \{(a_+(n) + a_-(n))(b_+(n) + b_-(n)) - a_-(n)b_-(n) + r_+ - r_-\}$$

Each secure computation apparatus $P_i$ outputs $c_+$ to the secure computation apparatus $P_+$, and $c_+$ is input to an input unit of the secure computation apparatus $P_+$.

Effects of the Invention

This allows secure multiplication or secure multiply-accumulate to be performed with a less number of additions/subtractions and multiplications and a less number of memory accesses compared to conventional techniques.

DETAILED DESCRIPTION OF THE EMBODIMENTS

Embodiments of the present invention are described below using the drawings.

First Embodiment

In a first embodiment, multiplication $ab \in F$ of arbitrary values $a, b \in F$ is performed by secure computation (secure multiplication). Here, F represents a finite field. This secure multiplication obtains secret sharing values of a multiplication result ab from secret sharing values (shares) of the arbitrary value a and secret sharing values of the arbitrary value b. This is described in detail below.

<Configuration>

Figure 1:
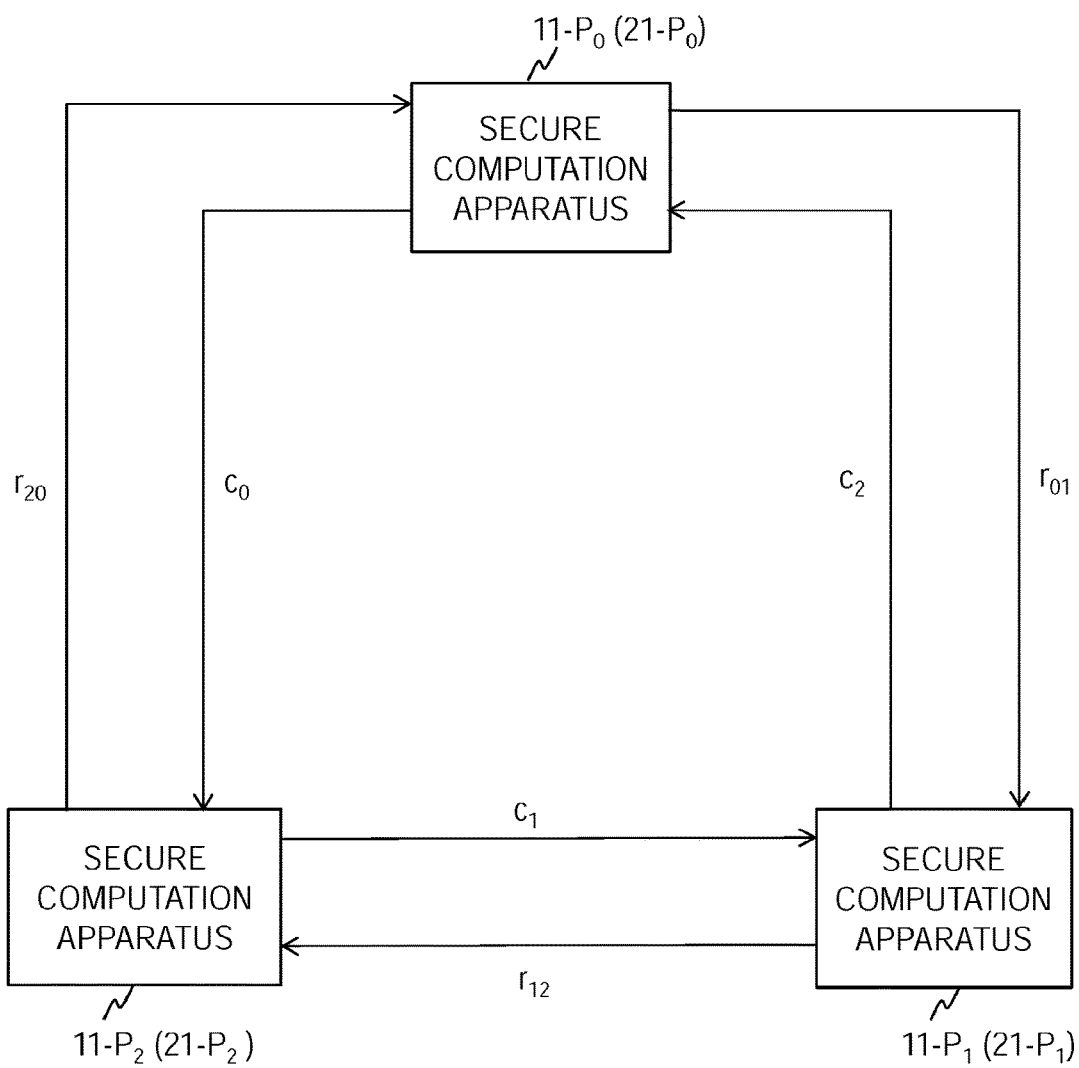
FIG. 1 is a block diagram illustrating a secure computation system according to an embodiment.
Figure 2:
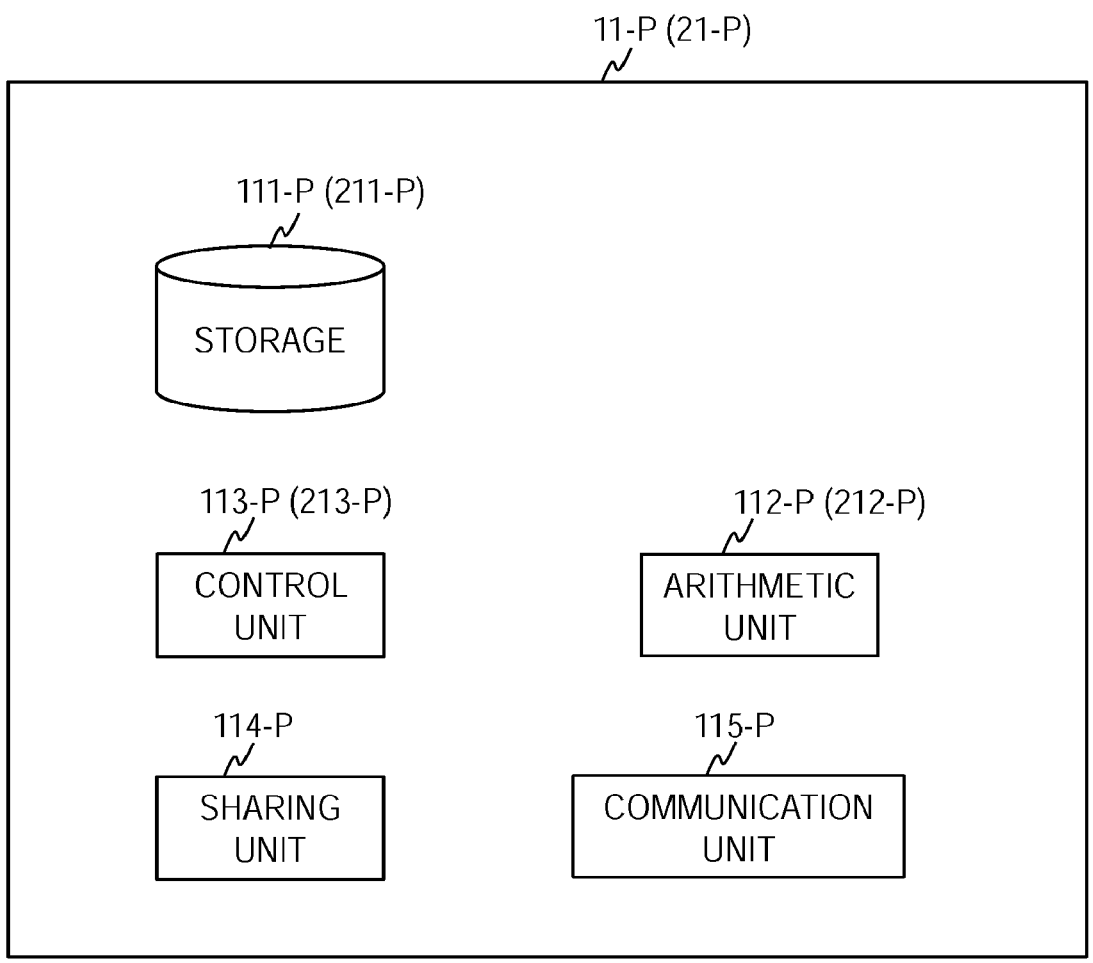
FIG. 2 is a block diagram illustrating a secure computation apparatus according to the embodiment.

As illustrated in FIG. 1, a secure computation system 1 of this embodiment includes three secure computation apparatuses 11-$P_0$, 11-$P_1$, 11-$P_2$ (secure computation apparatuses $P_0$, $P_1$, $P_2$). The secure computation apparatuses 11-$P_0$, 11-$P_1$, 11-$P_2$ are configured to be able to communicate over a communication network, such as the Internet. As illustrated in FIG. 2, a secure computation apparatus 11-P (where PE {$P_0$, $P_1$, $P_2$}) of this embodiment includes a storage 111-P (storage and memory), an arithmetic unit 112-P, a control unit 113-P, a sharing unit 114-P, and a communication unit 115-P. The secure computation apparatus 11-P executes various kinds of processing under control of the control unit 113-P and data resulting from the processing is sequentially stored in the storage 111-P and read out where necessary.

<Preliminary Processing>

Figure 3:
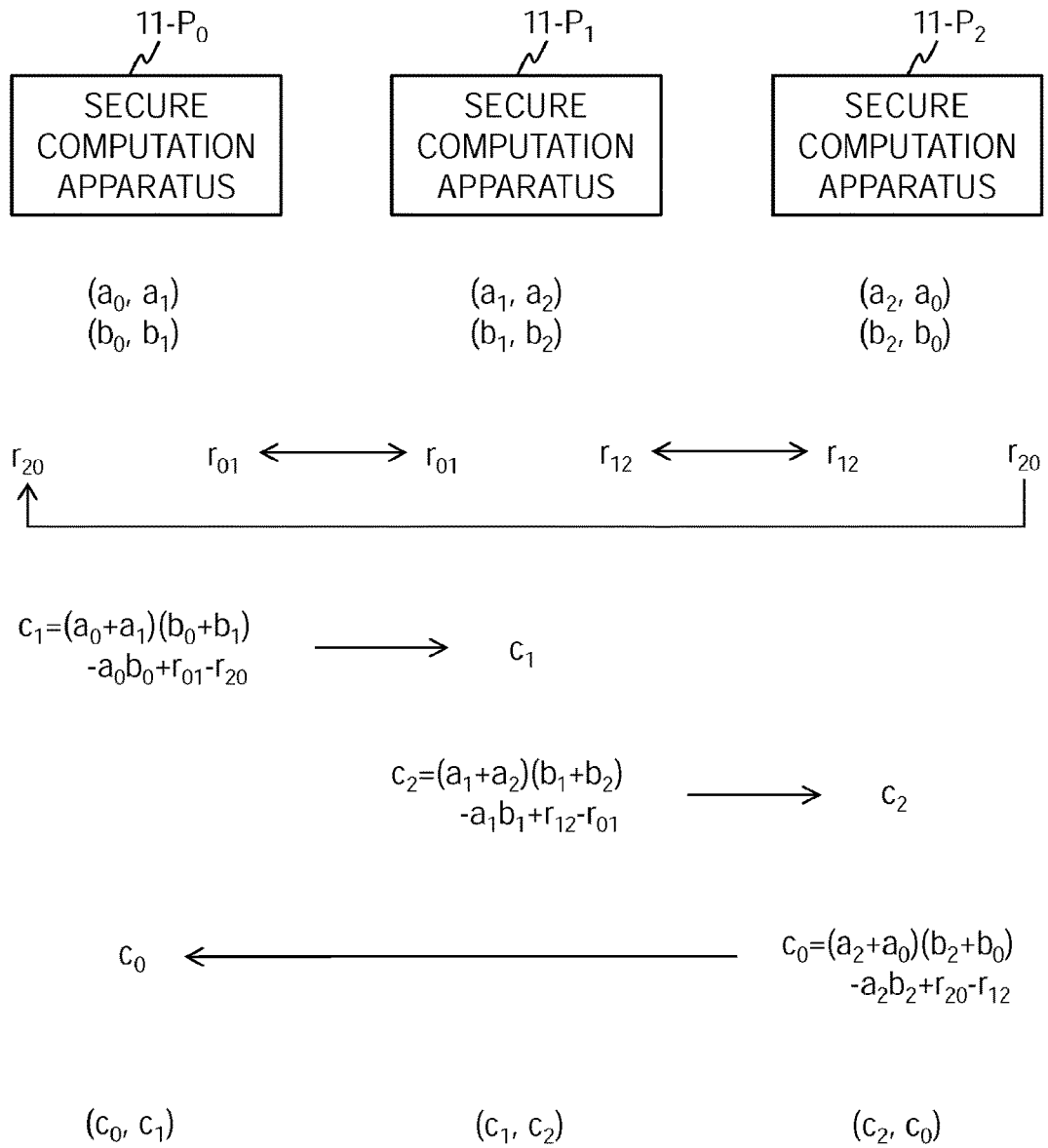
FIG. 3 is a conceptual diagram for explaining secure multiplication according to the embodiment.

Through preliminary processing, an arbitrary value a is secret-shared among subshares $a_0$, $a_1$, $a_2 \in F$ satisfying $a=a_0+a_1+a_2 \in F$, and an arbitrary value b is secret-shared among subshares $b_0$, $b_1$, $b_2 \in F$ satisfying $b=b_0+b_1+b_2 \in F$. A storage 111-$P_1$ of a secure computation apparatus 11-$P_i$ has stored therein subshares $a_+ \in \{a_0, a_1, a_2\}$ and $b_+ \in \{b_0, b_1, b_2\}$, and a storage 111-$P_+$ of a secure computation apparatus 11-$P_+$ also has stored therein the subshares $a_+$ and $b_+$. The subshare $a_+$ is any one element of $\{a_0, a_1, a_2\}$, and the subshare $b_+$ is any one element of $\{b_0, b_1, b_2\}$. The storage 111-$P_i$ of the secure computation apparatus 11-$P_i$ has stored therein subshares $a_- \in A_-$ and $b_- \in B_-$, and a storage 111-$P_-$ of a secure computation apparatus 11-$P_-$ also has stored therein subshares $a_-$ and $b_-$. The subshare $a_-$ is any one element of $A_-$, and the subshare $b_-$ is any one element of $B_-$. Here, $A_-$ is a complement of $a_+$ in $\{a_0, a_1, a_2\}$ ($A_-=\{a_0, a_1, a_2\}|\{a_+\}$), and $B_-$ is a complement of $b_+$ in $\{b_0, b_1, b_2\}$ ($B_-=\{b_0, b_1, b_2\}-\{b_+\}$). Also, $i \in \{0, 1, 2\}$ holds, $P_+$ is $P_{(i+1) \mod 3}$, and $P_-$ is $P_{(i-1) \mod 3}$. In the example of FIG. 3, subshares ($a_0$, $a_1$) and ($b_0$, $b_1$) are stored in the storage 111-$P_0$ of the secure computation apparatus 11-$P_0$, subshares ($a_1$, $a_2$) and ($b_1$, $b_2$) are stored in the storage 111-$P_1$ of the secure computation apparatus 11-$P_1$, and subshares ($a_2$, $a_0$) and ($b_2$, $b_0$) are stored in the storage 111-$P_2$ of the secure computation apparatus 11-$P_2$. Note that ($a_0$, $a_1$), ($a_1$, $a_2$), and ($a_2$, $a_0$) are secret sharing values of a, and ($b_0$, $b_1$), ($b_1$, $b_2$), and ($b_2$, $b_0$) are secret sharing values of b.

<Secure Computation>

Figure 4:
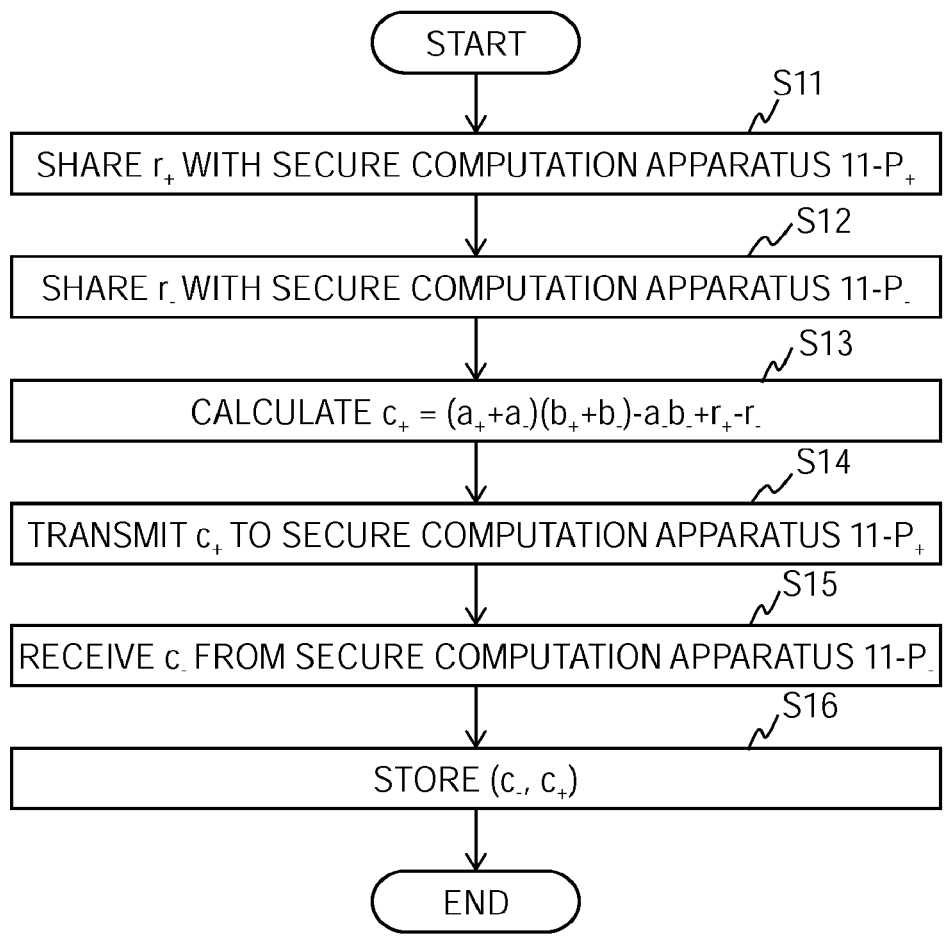
FIG. 4 is a flow diagram for explaining a secure computation method according to the embodiment.

On the precondition that this preliminary processing has been performed, each secure computation apparatus 11-$P_i$ (where $i \in \{0, 1, 2\}$) performs the following secure computation (FIGS. 3 and 4).

A sharing unit 114-$P_i$ of each secure computation apparatus 11-$P_i$ and a sharing unit 114-$P_+$ of the secure computation apparatus 11-$P_+$ share an arbitrary value $r_+ \in F$. That is, the sharing unit 114-$P_i$ and the sharing unit 114-$P_+$ each obtain the same arbitrary value $r_+$ as that obtained by the other. The shared arbitrary value $r_+$ is stored in the storage 111-$P_i$ and the storage 111-$P_+$. Examples of the arbitrary value $r_+$ include a pseudo random number, a true random number, a value selected from multiple predetermined values, an input value, a value resulting from a separate process, and the like. Sharing of the arbitrary value $r_+$ can be done in a known manner. For example, the arbitrary value $r_+$ may be shared between the sharing unit 114-$P_i$ and the sharing unit 114-$P_+$ by sending the arbitrary value $r_+$ or information for identifying the arbitrary value $r_+$ from the sharing unit 114-$P_i$ to the sharing unit 114-$P_+$. Conversely, the arbitrary value $r_+$ may be shared between the sharing unit 114-$P_i$ and the sharing unit 114-$P_+$ by sending the arbitrary value $r_+$ or information for identifying the arbitrary value $r_+$ from the sharing unit 114-$P_+$ to the sharing unit 114-$P_i$. The sharing unit 114-$P_i$ and the sharing unit 114-$P_+$ may also share a seed value with each other beforehand and perform predetermined processing using the seed value so that the arbitrary value $r_+$ is shared between the sharing unit 114-$P_i$ and the sharing unit 114-$P_+$. The arbitrary value $r_+$ may also be shared between the sharing unit 114-$P_i$ and sharing unit 114-$P_+$ by means of a known key exchange algorithm (step S11).

The sharing unit 114-$P_i$ of each secure computation apparatus 11-$P_i$ and the sharing unit 114-$P_-$ of the secure computation apparatus 11-$P_-$ share an arbitrary value $r_- \in F$. That is, the sharing unit 114-$P_i$ and the sharing unit 114-$P_-$ each obtain the same arbitrary value $r_-$ as that obtained by the other. The shared arbitrary value $r_-$ is stored in the storage 111-$P_i$ and the storage 111-$P_-$. Examples of the arbitrary value $r_-$ include a pseudo random number, a true random number, a value selected from multiple predetermined values, an input value, a value resulting from a separate process, and the like. Sharing of the arbitrary value $r_-$ can be done in a known manner. For example, the arbitrary value $r_-$ may be shared between the sharing unit 114-$P_i$ and the sharing unit 114-$P_-$ by sending the arbitrary value $r_-$ or information for identifying the arbitrary value $r_-$ from the sharing unit 114-$P_i$ to the sharing unit 114-$P_-$. Conversely, the arbitrary value $r_-$ may be shared between the sharing unit 114-$P_i$ and the sharing unit 114-$P_-$ by sending the arbitrary value $r_-$ or information for identifying the arbitrary value $r_-$ from the sharing unit 114-$P_-$ to the sharing unit 114-$P_i$. Alternatively, the sharing unit 114-$P_i$ and the sharing unit 114-$P_-$ may share a seed value with each other beforehand and perform predetermined processing using the seed value so that the arbitrary value $r_-$ is shared between the sharing unit 114-$P_i$ and the sharing unit 114-$P_-$. The arbitrary value $r_-$ may also be shared between the sharing unit 114-$P_i$ and the sharing unit 114-$P_-$ by means of a known key exchange algorithm (step S12).

In the example of FIG. 3, as the result of the processes at steps S11 and S12, the sharing unit 114-$P_0$ and the sharing unit 114-$P_1$ share an arbitrary value $r_{01} \in F$, the sharing unit 114-$P_i$ and the sharing unit 114-$P_2$ share an arbitrary value $r_{12} \in F$, and the sharing unit 114-$P_2$ and the sharing unit 114-$P_0$ share an arbitrary value $r_{20} \in F$.

An arithmetic unit 112-$P_i$ of each secure computation apparatus 11-$P_i$ uses $a_+$, $a_-$, $b_+$, $b_-$, $r_+$, and $r_-$ read from the storage 111-$P_i$ to calculate and output $c_+=(a_++a_-)(b_++b_-)-a_-b_-+r_+-r_- \in F$. In the example of FIG. 3, an arithmetic unit 112-$P_0$ of the secure computation apparatus 11-$P_0$ calculates and outputs $c_1=(a_0+a_1)(b_0+b_1)-a_0b_0+r_{01}-r_{20} \in F$, an arithmetic unit 112-$P_1$ of the secure computation apparatus 11-$P_1$ calculates and outputs $c_2=(a_1+a_2)(b_1+b_2)-a_1b_1+r_{12}-r_{01} \in F$, and an arithmetic unit 112-$P_2$ of the secure computation apparatus 11-$P_2$ calculates and outputs $c_0=(a_2+a_0)(b_2+b_0)-a_2b_2+r_{20}-r_{12} \in F$ (step S13).

A communication unit 115-$P_i$ of each secure computation apparatus 11-$P_1$ transmits $c_+$ (outputs $c_+$) to the secure computation apparatus 11-$P_+$ (step S14). $c_+$ is received by (input to) a communication unit 115-$P_+$ of the secure computation apparatus 11-$P_+$. Letting $c_-$ represent a value calculated by an arithmetic unit 112-$P_-$ of the secure computation apparatus 11-$P_-$ and transmitted from a communication unit 115-$P_-$, the communication unit 115-$P_i$ of each secure computation apparatus 11-$P_i$ receives $c_-$ (step S15). In the example of FIG. 3, a communication unit 115-$P_0$ of the secure computation apparatus 11-$P_0$ transmits $c_1$ to the secure computation apparatus 11-$P_1$, and $c_1$ is received by a communication unit 115-$P_1$ of the secure computation apparatus 11-$P_1$. The communication unit 115-$P_1$ of the secure computation apparatus 11-$P_1$ transmits $c_2$ to the secure computation apparatus 11-$P_2$, and $c_2$ is received by a communication unit 115-$P_2$ of the secure computation apparatus 11-$P_2$. The communication unit 115-$P_2$ of the secure computation apparatus 11-$P_2$ transmits $c_0$ to the secure computation apparatus 11-$P_0$, and $c_0$ is received by the communication unit 115-$P_0$ of the secure computation apparatus 11-$P_0$ (steps S14 and S15).

$c_-$ received at step S15 and $c_+$ obtained at step S13 are stored in the storage 111-$P_i$ of each secure computation apparatus 11-$P_i$. In the example of FIG. 3, ($c_0$, $c_1$) are stored in the storage 111-$P_0$ of the secure computation apparatus 11-$P_0$, ($c_1$, $c_2$) are stored in the storage 111-$P_i$ of the secure computation apparatus 11-$P_1$, and ($c_2$, $c_0$) are stored in the storage 111-$P_2$ of the secure computation apparatus 11-$P_2$ (step S16).

$c_0$, $c_1$, and $c_2$ in this embodiment are the subshares of the multiplication result ab which satisfies ab=$c_0$+$c_1$+$c_2 \in$ F, and ($c_0$, $c_1$), ($c_1$, $c_2$), and ($c_2$, $c_0$) are the secret sharing values of the multiplication result ab. Obtaining any two of these secret sharing values ($c_0$, $c_1$), ($c_1$, $c_2$), ($c_2$, $c_0$) allows reconstruction of the multiplication result ab. That is, $c_0$+$c_1$+$c_2$=ab is satisfied. In the example of FIG. 3, $$c_0 + c_1 + c_2 =$$
$$(a_0 + a_1)(b_0 + b_1) - a_0 b_0 + r_{01} - r_{20} + (a_1 + a_2)(b_1 + b_2) - a_1 b_1 +$$
$$r_{12} - r_{01} + (a_2 + a_0)(b_2 + b_0) - a_2 b_2 + r_{20} - r_{12} =$$
$$a_0 b_1 + a_1 b_0 + a_1 b_1 + a_1 b_2 + a_2 b_1 + a_2 b_2 + a_2 b_0 + a_0 b_2 + a_0 b_0 =$$
$$(a_0 + a_1 + a_2)(b_0 + b_1 + b_2) = ab \text{ holds.}$$

($c_-$, $c_+$) stored in the storage 111-$P_i$ of each secure computation apparatus 11-$P_i$ may be provided as input to a further secure computation apparatus (not shown), or may be provided as input to a reconstruction apparatus (not shown) which reconstructs the multiplication result ab for reconstruction and output of the multiplication result ab.

Features of this Embodiment

As shown above, this embodiment allows secure multiplication to be performed with a less number of additions/subtractions and multiplications and a less number of memory accesses compared to the conventional scheme described in Patent Literature 1. More specifically, the conventional scheme described in Patent Literature 1 requires each secure computation apparatus to save, in its memory, values obtained by performing additions/subtractions and multiplications on its own using secret sharing values or the like stored in the memory, to receive values that were obtained at another secure computation apparatus by additions/subtractions and multiplications and save them in the memory, and to further perform additions/subtractions and multiplications using these values saved in the memory. The scheme of Patent Literature 1 accordingly involves large numbers of additions/subtractions and multiplications and memory accesses. In this embodiment, by contrast, values that are obtained by each secure computation apparatus by performing additions/subtractions and multiplications on its own using secret sharing values and the like stored in its memory and values that are obtained at another secure computation apparatus by performing additions/subtractions and multiplication directly become the subshares of an arithmetic result. Thus, it involves a less number of additions/subtractions and multiplications and a less number of memory accesses than the scheme of Patent Literature 1. Particularly in secure computation of high arithmetic speed, the time for memory access creates a bottleneck in the improvement of the overall arithmetic speed. Because the scheme of this embodiment allows reduction in the number of memory accesses, it can significantly improve the arithmetic speed. For example, when calculating $c_{XY}$=$a_- b_-$+$a_+ b_-$−$r_{ZX}$, secure multiplication with a conventional technique reads $a_-$, $b_+$, $a_+$, and $b_-$ and writes the resulting $c_{XY}$. This requires execution of two multiplications and two additions/subtractions. Further, when calculating $c_-$=$a_- b_-$+$c_{ZX}$+$r_{ZX}$, secure multiplication with the conventional technique reads $a_-$, $b_-$, and $c_{ZX}$ and writes $c_-$. This requires execution of one multiplication and three additions/subtractions. Still further, when calculating $c_+$=$a_+ b_+$+$c_{XY}$+$r_{XY}$, secure multiplication with the conventional technique reads $a_+$, $b_+$, and $c_{XY}$ and writes the resulting $c_+$. This requires execution of one multiplication and three additions/subtractions. Consequently, in total, it is necessary to perform ten reading operations, three writing operations, four multiplications, and eight additions/subtractions per party. By contrast, when calculating $c_+$=($a_+$+$a_-$)($b_+$+$b_-$)−$a_- b_-$+$r_+$−$r_-$, the secure computation apparatus 10-$P_i$ of this embodiment reads $a_-$, $b_+$, $a_+$, and $b_-$ and writes the resulting $c_+$. Thus, in total, only four reading operations, one writing operation, two multiplications, and five additions/subtractions are required per party. Compared to the conventional technique, this embodiment can lessen the number of reading operations to 40%, the number of writing operations to 33%, the number of multiplications to 50%, and the number of additions/subtractions to 63%.

Second Embodiment

In a second embodiment, multiply-accumulate a(0)b(0)+ . . . +a(N−1)b(N−1)∈F with arbitrary values a(0), a(N−1) and b(0), b(N−1) is performed by secure computation (secure multiply-accumulate). Here, F represents a finite field and N is a positive integer (for example, an integer greater than 1). This secure multiply-accumulate obtains secret sharing values of a multiply-accumulate result a(0)b(0)+ . . . +a(N−1)b(N−1) from secret sharing values of an arbitrary value a(n) and secret sharing values of an arbitrary value b(n) for n=0, . . . , N−1. This is described in detail below.

<Configuration>

As illustrated in FIG. 1, a secure computation system 2 of this embodiment includes three secure computation apparatuses 21-$P_0$, 21-$P_1$, 21-$P_2$ (secure computation apparatuses $P_0$, $P_1$, $P_2$). The secure computation apparatuses 21-$P_0$, 21-$P_1$, 21-$P_2$ are configured to be able to communicate over a communication network, such as the Internet. As illustrated in FIG. 2, a secure computation apparatus 21-P (where P∈{$P_0$, $P_1$, $P_2$}) of this embodiment includes a storage 211-P (storage and memory), an arithmetic unit 212-$P_i$ a control unit 213-$P_i$ a sharing unit 114-$P_i$ and a communication unit 115-P. The secure computation apparatus 21-P executes various kinds of processing under control of the control unit 213-P and data resulting from the processing is sequentially stored in the storage 211-P and read out where necessary.

<Preliminary Processing>

Figure 5:
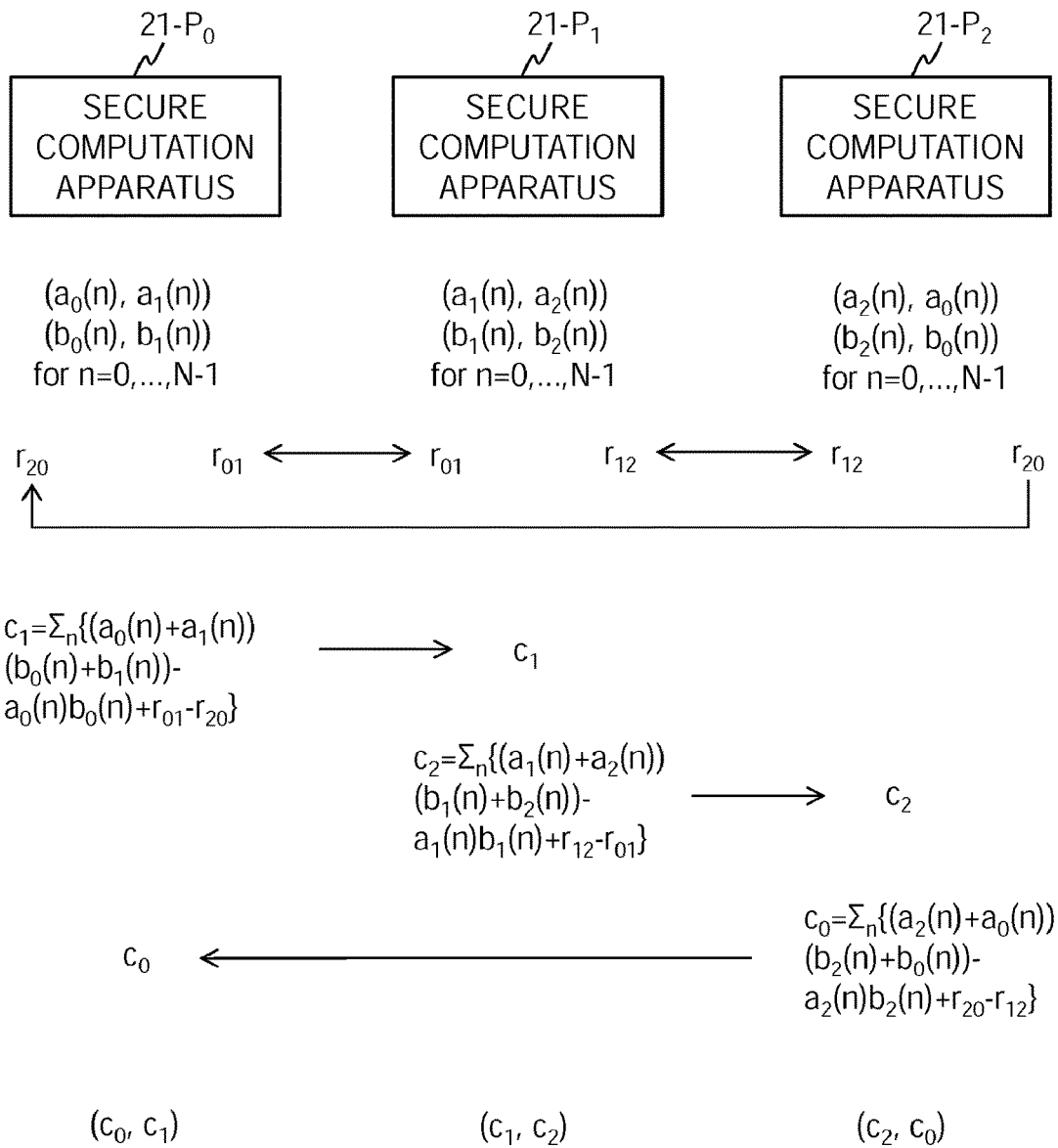
FIG. 5 is a conceptual diagram for explaining secure multiply-accumulate according to a further embodiment.

Through preliminary processing, an arbitrary value a(n) is secret-shared among subshares $a_0$(n), $a_1$(n), $a_2$(n)∈F satisfying a(n)=$a_0$(n)+$a_1$(n)+$a_2$(n)∈F, and an arbitrary value b(n) is secret-shared among subshares $b_0$(n), $b_1$(n), $b_2$(n)∈F satisfying b(n)=$b_0$(n)+$b_1$(n)+$b_2$(n)∈F, for n=0, . . . , N−1 (where N is a positive integer, for example, N is an integer greater than 1). A storage 211-$P_i$ of a secure computation apparatus 21-$P_i$ has stored therein subshares $a_+$(n)∈{$a_0$(n), $a_1(n), a_2(n)$} and $b_+(n) \in \{b_0(n), b_1(n), b_2(n)\}$ for $n=0, \ldots, N-1$, and a storage $211\text{-}P_+$ of a secure computation apparatus $21\text{-}P_+$ also has stored therein the subshares $a_+(n)$ and $13_+(n)$ for $n=0, \ldots, N-1$. Each subshare $a_+(n)$ is any one element of $\{a_0(n), a_1(n), a_2(n)\}$, and each subshare $b_+(n)$ is any one element of $\{b_0(n), b_1(n), b_2(n)\}$. The storage $211\text{-}P_i$ of the secure computation apparatus $21\text{-}P_i$ has stored therein subshares $a_-(n) \in A_-(n)$ and $b_-(n) \in B_-(n)$ for $n=0, \ldots, N-1$, and a storage $211\text{-}P_-$ of a secure computation apparatus $21\text{-}P_-$ also has stored therein subshares $a_-(n)$ and $b_-(n)$ for $n=0, \ldots, N-1$. Each subshare $a_-(n)$ is any one element of $A_-(n)$, and each subshare $b_-(n)$ is any one element of $B_-(n)$. Here, $A_-(n)$ is a complement of $a_+(n)$ in $\{a_0(n), a_1(n), a_2(n)\}$ ($A_-(n) = \{a_0(n), a_1(n), a_2(n)\} - \{a_+(n)\}$), and $B_-(n)$ is a complement of $b_+(n)$ in $\{b_0(n), b_1(n), b_2(n)\}$ ($B_-(n) = \{b_0(n), b_1(n), b_2(n)\} - \{b_+(n)\}$). Also, $i \in \{0, 1, 2\}$ holds, $P_+$ is $P_{(i+1) \bmod 3}$, and $P_-$ is $P_{(i-1) \bmod 3}$. In the example of FIG. 5, subshares $(a_0(n), a_1(n))$ and $(b_0(n), b_1(n))$ for $n=0, \ldots, N-1$ are stored in a storage $211\text{-}P_0$ of the secure computation apparatus $21\text{-}P_0$, subshares $(a_1(n), a_2(n))$ and $(b_1(n), b_2(n))$ for $n=0, \ldots, N-1$ are stored in a storage $211\text{-}P_1$ of the secure computation apparatus $21\text{-}P_1$, and subshares $(a_2(n), a_0(n))$ and $(b_2(n), b_0(n))$ for $n=0, \ldots, N-1$ are stored in a storage $211\text{-}P_2$ of the secure computation apparatus $21\text{-}P_2$. Note that $(a_0(n), a_1(n))$, $(a_1(n), a_2(n))$, and $(a_2(n), a_0(n))$ are secret sharing values of $a(n)$, and $(b_0(n), b_1(n))$, $(b_1(n), b_2(n))$, and $(b_2(n), b_0(n))$ are secret sharing values of $b(n)$.

<Secure Computation>

Figure 6:
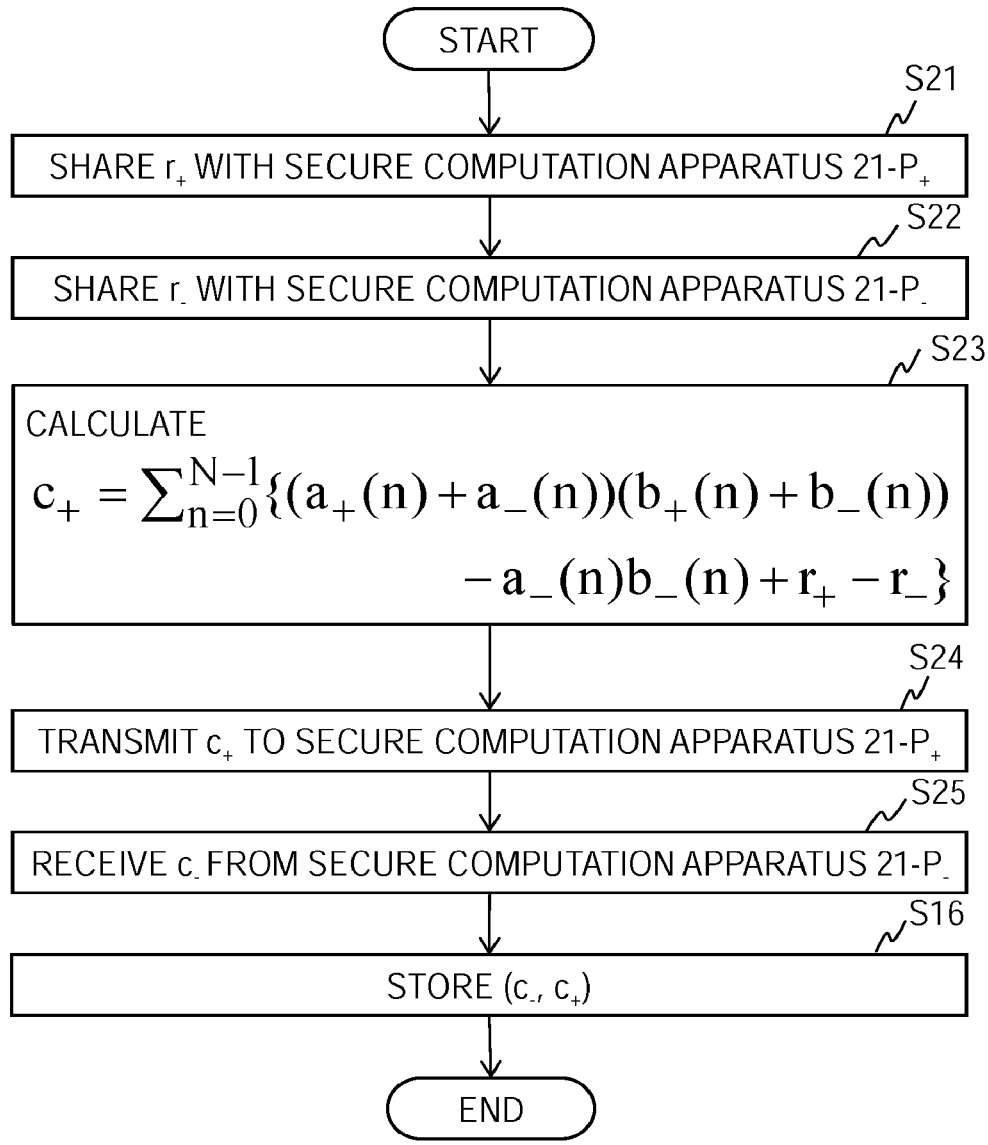
FIG. 6 is a flow diagram for explaining a secure computation method according to the further embodiment.

On the precondition that this preliminary processing has been performed, each secure computation apparatus $21\text{-}P_i$ (where $i \in \{0, 1, 2\}$) performs the following secure computation (FIGS. 5 and 6).

A sharing unit $114\text{-}P_i$ of each secure computation apparatus $21\text{-}P_i$ and a sharing unit $114\text{-}P_+$ of the secure computation apparatus $21\text{-}P_+$ share an arbitrary value $r_+ \in F$. The shared arbitrary value $r_+$ is stored in the storage $211\text{-}P_i$ and the storage $211\text{-}P_+$. Specific examples of the arbitrary value $r_+$ and the process of sharing it were described in the first embodiment (step S21).

The sharing unit $114\text{-}P_i$ of each secure computation apparatus $21\text{-}P_i$ and the sharing unit $114\text{-}P_-$ of the secure computation apparatus $21\text{-}P_-$ share an arbitrary value $r_- \in F$. The shared arbitrary value $r_-$ is stored in the storage $211\text{-}P_i$ and the storage $211\text{-}P_-$. Specific examples of the arbitrary value $r_-$ and the process of sharing it were described in the first embodiment (step S22).

In the example of FIG. 5, as the result of the processes at steps S21 and S22, the sharing unit $114\text{-}P_0$ and the sharing unit $114\text{-}P_1$ share an arbitrary value $r_{01} \in F$, the sharing unit $114\text{-}P_1$ and the sharing unit $114\text{-}P_2$ share an arbitrary value $r_{12} \in F$, and the sharing unit $114\text{-}P_2$ and the sharing unit $114\text{-}P_0$ share an arbitrary value $r_{20} \in F$.

An arithmetic unit $212\text{-}P_i$ of each secure computation apparatus $21\text{-}P_i$ uses $a_+(n), a_-(n), b_+(n), b_-(n), r_+$, and $r_-$ for $n=0, \ldots, N-1$ read from the storage $211\text{-}P_i$ to calculate and output:

$$c_+ = \Sigma_{n=0}^{N-1} \{(a_+(n)+a_-(n))(b_+(n)+b_-(n)) - a_-(n)b_-(n) + r_+ - r_-\} \in F$$

In the example of FIG. 5, the arithmetic unit $212\text{-}P_0$ of the secure computation apparatus $21\text{-}P_0$ calculates and outputs:

$$c_1 = \Sigma_{n=0}^{N-1} \{(a_0(n)+a_1(n))(b_0(n)+b_1(n)) - a_0(n)b_0(n) + r_{01} - r_{20}\} \in F$$

the arithmetic unit $212\text{-}P_1$ of the secure computation apparatus $21\text{-}P_1$ calculates and outputs:

$$c_2 = \Sigma_{n=0}^{N-1} \{(a_1(n)+a_2(n))(b_1(n)+b_2(n)) - a_1(n)b_1(n) + r_{12} - r_{01}\} \in F$$

and the arithmetic unit $212\text{-}P_2$ of the secure computation apparatus $21\text{-}P_2$ calculates and outputs:

$$c_0 = \Sigma_{n=0}^{N-1} \{(a_2(n)+a_0(n))(b_2(n)+b_0(n)) - a_2(n)b_2(n) + r_{20} - r_{12}\} \in F$$

(step S23).

A communication unit $115\text{-}P_i$ of each secure computation apparatus $21\text{-}P_i$ transmits $c_+$ (outputs $c_+$) to the secure computation apparatus $21\text{-}P_+$ (step S24). $c_+$ is received by (input to) a communication unit $115\text{-}P_+$ of the secure computation apparatus $21\text{-}P_+$. Letting $c_-$ represent a value calculated by an arithmetic unit $212\text{-}P_-$ of the secure computation apparatus $21\text{-}P_-$ and transmitted from the communication unit $115\text{-}P_-$ the communication unit $115\text{-}P_i$ of each secure computation apparatus $21\text{-}P_i$ receives $c_-$ (step S25). In the example of FIG. 5, a communication unit $115\text{-}P_0$ of the secure computation apparatus $21\text{-}P_0$ transmits $c_1$ to the secure computation apparatus $21\text{-}P_1$, and $c_1$ is received by a communication unit $115\text{-}P_i$ of the secure computation apparatus $21\text{-}P_1$. The communication unit $115\text{-}P_1$ of the secure computation apparatus $21\text{-}P_1$ transmits $c_2$ to the secure computation apparatus $21\text{-}P_2$, and $c_2$ is received by a communication unit $115\text{-}P_2$ of the secure computation apparatus $21\text{-}P_2$. The communication unit $115\text{-}P_2$ of the secure computation apparatus $21\text{-}P_2$ transmits $c_0$ to the secure computation apparatus $21\text{-}P_0$, and $c_0$ is received by the communication unit $115\text{-}P_0$ of the secure computation apparatus $21\text{-}P_0$ (steps S24 and S25).

$c_-$ received at step S25 and $c_+$ obtained at step S23 are stored in the storage $211\text{-}P_i$ of each secure computation apparatus $21\text{-}P_i$. In the example of FIG. 5, $(c_0, c_1)$ are stored in the storage $211\text{-}P_0$ of the secure computation apparatus $21\text{-}P_0$, $(c_1, c_2)$ are stored in the storage $211\text{-}P_1$ of the secure computation apparatus $21\text{-}P_1$, and $(c_2, c_0)$ are stored in the storage $211\text{-}P_2$ of the secure computation apparatus $21\text{-}P_2$ (step S16).

$c_0$, $c_1$, and $c_2$ in this embodiment are the subshares of the multiply-accumulate result $a(0)b(0) + \ldots + a(N-1)b(N-1)$, which satisfies $a(0)b(0) + \ldots + a(N-1)b(N-1) = c_0 + c_1 + c_2 \in F$. $(c_0, c_1), (c_1, c_2),$ and $(c_2, c_0)$ are the secret sharing values of the multiply-accumulate result $a(0)b(0) + \ldots + a(N-1)b(N-1)$. Obtaining any two of these secret sharing values $(c_0, c_1)$, $(c_1, c_2)$, $(c_2, c_0)$ allows reconstruction of the multiply-accumulate result $a(0)b(0) + \ldots + a(N-1)b(N-1)$. That is, $c_0 + c_1 + c_2 = a(0)b(0) + \ldots + a(N-1)b(N-1)$ is satisfied.

$(c_-, c_+)$ stored in the storage $211\text{-}P_i$ of each secure computation apparatus $21\text{-}P_i$ may be provided as input to a further secure computation apparatus (not shown), or may be provided as input to a reconstruction apparatus (not shown) which reconstructs the multiply-accumulate result $a(0)b(0) + \ldots + a(N-1)b(N-1)$ for reconstruction and output of the multiply-accumulate result $a(0)b(0) + \ldots + a(N-1)b(N-1)$.

Features of this Embodiment

As shown above, this embodiment allows secure multiply-accumulate to be performed with a less number of additions/subtractions and multiplications and a less number of memory accesses compared to the conventional scheme described in Patent Literature 1.

It is to be noted that the present invention is not limited to the foregoing embodiments. For example, the above-described various kinds of processing may be executed, in addition to being executed in chronological order in accordance with the descriptions, in parallel or individually depending on the processing power of an apparatus that executes the processing or when needed. In addition, it goes without saying that changes may be made as appropriate without departing from the spirit of the present invention. Also, the arbitrary value $r_+$ in the second embodiment may be $r_+(n)$ corresponding to each one of $n=0, \ldots, N-1$, and the arbitrary value $r_-$ may be $r_-(n)$ corresponding to each one of $n=0, \ldots, N-1$. For instance, in the example of FIG. 5, the arbitrary value $r_{01}$ may be $r_{01}(n) \in F$ corresponding to each one of $n=0, \ldots, N-1$, and the arbitrary value $r_{20}$ may be $r_{20}(n) \in F$ corresponding to each one of $n=0, \ldots, N-1$.

The above-described each apparatus is embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements functional components by loading of programs like a CPU. An electronic circuit constituting a single apparatus may include multiple CPUs.

When the above-described configurations are implemented by a computer, the processing details of the functions supposed to be provided in each apparatus are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present apparatuses, at least some of the processing functions may be implemented by hardware.

DESCRIPTION OF REFERENCE NUMERALS 1, 2 secure computation system
11-P secure computation apparatus

What is claimed is:
1. A secure computation system comprising:
a secure computation apparatus $P_0$;
a secure computation apparatus $P_i$; and
a secure computation apparatus $P_2$, wherein
each of the secure computation apparatuses comprising processing circuitry configured to receive, over a network, an input of one or more respective subshares of data a and b, wherein the data a and b is concealed from each of the secure computation apparatuses;
$i \in \{0, 1, 2\}$ holds; $P_+$ is $P_{(i+1) \bmod 3}$; $P_-$ is $P_{(i-1) \bmod 3}$; a and b are arbitrary values; $a_0, a_1,$ and $a_2$ are subshares satisfying $a = a_0 + a_1 + a_2$; $b_0, b_1,$ and $b_2$ are subshares satisfying $b = b_0 + b_1 + b_2$,
a storage of a secure computation apparatus $P_i$ and a storage of a secure computation apparatus $P_+$ have stored therein subshares $a_+ \in \{a_0, a_1, a_2\}$ and $b_+ \in \{b_0, b_1, b_2\}$,
the storage of the secure computation apparatus $P_i$ and a storage of a secure computation apparatus $P_-$ have stored therein subshares $a_- \in A_-$ and $b_- \in B_-$, where $A_-$ is a complement of $a_+$ in $\{a_0, a_1, a_2\}$ and $B_-$ is a complement of $b_+$ in $\{b_0, b_1, b_2\}$,
a sharing unit of the secure computation apparatus $P_i$ and a sharing unit of the secure computation apparatus $P_+$ share an arbitrary value $r_+$, wherein $r_+ \in F$,
the sharing unit of the secure computation apparatus $P_i$ and a sharing unit of the secure computation apparatus $P_-$ share an arbitrary value $r_-$, wherein $r_- \in F$,
an arithmetic unit of the secure computation apparatus $P_i$ calculates $c_+ = (a_+ + a_-)(b_+ + b_-) - a_- b_- + r_+ - r_-$, wherein $c_+ \in \{c_0, c_1, c_2\}$, and $c_0 + c_1 + c_2 = a*b$, and
an output unit of the secure computation apparatus $P_i$ outputs $c_+$ to the secure computation apparatus $P_+$, and $c_+$ is input to an input unit of the secure computation apparatus $P_+$, which results in an exchange process of secure computation apparatus $P_0$ calculating $c_i$ and transmitting $c_1$ to secure computation apparatus $P_1$, secure computation apparatus $P_1$ calculating and transmitting $c_2$ to secure computation apparatus $P_2$ and secure computation apparatus $P_2$ calculating $c_0$ and transmitting $c_0$ to secure computation apparatus $P_0$,
wherein after the exchange process, each of $P_0, P_1,$ and $P_2$ store a different pair of values among $c_0, c_1, c_2$.
2. A secure computation system comprising:
a secure computation apparatus $P_0$;
a secure computation apparatus $P_1$; and
a secure computation apparatus $P_2$, wherein
each of the secret computation apparatuses comprising processing circuitry configured to receive, over a network, an input of one or more respective subshares of data $a(n)$ and $b(n)$, wherein the data $a(n)$ and $b(n)$ is concealed from each of the secret computation apparatuses;
$i \in \{0, 1, 2\}$ holds; $P_+$ is $P_{(i+1) \bmod 3}$; $P_-$ is $P_{(i-1) \bmod 3}$; $a(n)$ and $b(n)$ are arbitrary values; $a_0(n), a_1(n),$ and $a_2(n)$ are subshares of $a(n)$ satisfying $a(n) = a_0(n) + a_1(n) + a_2(n)$;

$b_0(n)$, $b_1(n)$, and $b_2(n)$ are subshares of $b(n)$ satisfying $b(n)=b_0(n)+b_1(n)+b_2(n)$; and N is a positive integer, where $n=0, \ldots, N-1$, a storage of a secure computation apparatus $P_i$ and a storage of a secure computation apparatus $P_+$ have stored therein subshares $a_+(n) \in \{a_0(n), a_1(n), a_2(n)\}$ and $b_+(n) \in \{b_0(n), b_1(n), b_2(n)\}$, the storage of the secure computation apparatus $P_i$ and a storage of a secure computation apparatus $P_-$ have stored therein subshares $a_-(n) \in A_-(n)$ and $b_-(n) \in B_-(n)$, where $A_-(n)$ is a complement of $a_+(n)$ in $\{a_0(n), a_1(n), a_2(n)\}$ and $B_-(n)$ is a complement of $b_+(n)$ in $\{b_0(n), b_1(n), b_2(n)\}$, a sharing unit of the secure computation apparatus $P_i$ and a sharing unit of the secure computation apparatus $P_+$ share an arbitrary value $r_+$, wherein $r_+ \in F$, the sharing unit of the secure computation apparatus $P_i$ and a sharing unit of the secure computation apparatus $P_-$ share an arbitrary value $r_-$, wherein $r_- \in F$, an arithmetic unit of the secure computation apparatus $P_i$ calculates:

$$c_+ = \Sigma_{n=0}^{N-1}\{(a_+(n)+a_-(n))(b_+(n)+b_-(n)) - a_-(n)b_-(n) + r_+ - r_-\},$$

wherein $c_+\{c_0, c_1, c_2\}$, and $c_0+c_1+c_2=a(0)b(0)+ \ldots +a(N-1)b(N-1)$, and an output unit of the secure computation apparatus $P_i$ outputs $c_+$ to the secure computation apparatus $P_+$, and $c_+$ is input to an input unit of the secure computation apparatus $P_+$, which results in an exchange process of secure computation apparatus $P_0$ calculating $c_1$ and transmitting $c_1$ to secure computation apparatus $P_1$, secure computation apparatus $P_1$ calculating $c_2$ and transmitting $c_2$ to secure computation apparatus $P_2$ and secure computation apparatus $P_2$ calculating $c_0$ and transmitting $c_0$ to secure computation apparatus $P_0$, wherein after the exchange process, each of $P_0$, $P_1$, and $P_2$ store a different pair of values among $c_0$, $c_1$, $c_7$.

3. A secure computation apparatus, wherein the secure computation apparatus is one of a plurality of secure computation apparatuses $P_0$, $P_1$, and $P_2$, each of the secure computation apparatuses comprising processing circuitry configured to receive, over a network, an input of one or more respective subshares of data a and b, wherein the data a and b is concealed from each of the secure computation apparatuses;

$i \in \{0, 1, 2\}$ holds; $P_+$ is $P_{(i-1)mod\ 3}$, $P_-$ is $P_{(i-1)mod\ 3}$, a and b are arbitrary values; $a_0$, $a_1$, and $a_2$ are subshares of a satisfying $a=a_0+a_1+a_2$, and $b_0$, $b_1$, and $b_2$ are subshares of b satisfying $b=b_0+b_1+b_2$, and the secure computation apparatus includes a storage that stores subshares $a_+ \in \{a_0, a_1, a_2\}$ and $b_+ \in \{b_0, b_1, b_2\}$ which are stored on a secure computation apparatus P and subshares $a_- \in A_-$ and $b_- \in B_-$ which are stored on a secure computation apparatus $P_-$ (where $A_-$ is a complement of $a_+$ in $\{a_0, a_1, a_2\}$ and $B_-$ is a complement of $b_+$ in $\{b_0, b_1, b_2\}$), a sharing unit that shares an arbitrary value $r_+$ with the secure computation apparatus $P_+$ and shares an arbitrary value $r_-$ with the secure computation apparatus $P_-$, wherein $r_+ \in F$ and $r_- \in F$, an arithmetic unit that calculates $c_+ = (a_+ + a_-)(b_+ + b_-) - a_- b_- r_+ r_-$, wherein $c_+ \in \{c_0, c_1, c_2\}$, and $c_0 + c_1 + c_2 = a*b$, and an output unit that outputs $c_+$ to the secure computation apparatus $P_+$, which results in an exchange process of secure computation apparatus $P_0$ calculating $c_1$ and transmitting $c_1$ to secure computation apparatus $P_1$, secure computation apparatus $P_1$ calculating $c_2$ and transmitting $c_2$ to secure computation apparatus $P_2$ and secure computation apparatus $P_2$ calculating $c_0$ and transmitting $c_0$ to secure computation apparatus $P_0$, wherein after the exchange process, each of $P_0$, $P_1$, and $P_2$ store a different pair of values among $c_0$, $c_1$, $c_2$.

4. A secure computation apparatus, wherein the secure computation apparatus is one of a plurality of secure computation apparatuses $P_0$, $P_1$, and $P_2$, each of the secure computation apparatuses comprising processing circuitry configured to receive, over a network, an input of one or more respective subshares of data a(n) and b(n), wherein the data a(n) and b(n) is concealed from each of the secure computation apparatuses;

$i \in \{0, 1, 2\}$ holds; $P_+$ is $P_{(i+1)mod\ 3}$; $P_-$ is $P_{(i-1)mod\ 3}$; a(n) and b(n) are arbitrary values; $a_0(n)$, $a_1(n)$, and $a_2(n)$ are subshares of a(n) satisfying $a(n)=a_0(n)+a_1(n)+a_2(n)$; and $b_0(n)$, $b_1(n)$, and $b_2(n)$ are subshares of b(n) satisfying $b(n)=b_0(n)+b_1(n)+b_2(n)$, and the secure computation apparatus includes a storage that stores subshares $a_+(n) \in \{a_0(n), a_1(n), a_2(n)\}$ and $b_+(n) \in \{b_0(n), b_1(n), b_2(n)\}$ which are stored on a secure computation apparatus $P_+$, and subshares $a_-(n) \in A_-(n)$ and $b_-(n) \in B_-(n)$ which are stored on a secure computation apparatus $P_-$ (where $A_-(n)$ is a complement of $a_+(n)$ in $\{a_0(n), a_1(n), a_2(n)\}$ and $B_-(n)$ is a complement of $b_+(n)$ in $\{b_0(n), b_1(n), b_2(n)\}$), a sharing unit that shares an arbitrary value $r_+$ with the secure computation apparatus $P_+$ and shares an arbitrary value $r_-$ with the secure computation apparatus $P_-$, wherein $r_+ \in F$ and $r_- \in F$, an arithmetic unit that calculates:

$$c_+ = \Sigma_{n=0}^{N-1}\{(a_+(n)+a_-(n))(b_+(n)+b_-(n)) - a_-(n)b_-(n) + r_+ - r_-\},$$

wherein $c_+ \in \{c_0, c_1, c_2\}$, and $c_0+c_1+c_2=a(0)b(0)+ \ldots +a(N-1)b(N-1)$, and an output unit that outputs to the secure computation apparatus $P_{++}$, which results in an exchange process of secure computation apparatus $P_0$ calculating $c_1$ and transmitting $c_1$ to secure computation apparatus $P_1$, secure computation apparatus $P_1$ calculating $c_2$ and transmitting $c_2$ to secure computation apparatus $P_2$ and secure computation apparatus $P_2$ calculating $c_0$ and transmitting $c_0$ to secure computation apparatus $P_0$, wherein after the exchange process, each of $P_0$, $P_1$, and $P_2$ store a different pair of values among $c_0$, $c_1$, $c_7$.

5. The secure computation apparatus according to claim 4, wherein the arbitrary value $r_+$ is $r_+(n)$ and the arbitrary value $r_-$ is $r_-(n)$.

6. A computer-readable recording medium storing a program for causing a computer to function as the secure computation apparatus according to claim 3 or 4.

7. A secure computation method implemented by a secure computation apparatus, wherein the secure computation apparatus is one of a plurality of secure computation apparatuses $P_0$, $P_1$, and $P_2$, each of the secure computation apparatuses comprising processing circuitry configured to receive, over a network, an input of one or more respective subshares of data a and b, wherein the data a and b is concealed from each of the secure computation apparatuses;

$i \in \{0, 1, 2\}$ holds; $P_+$ is $P_{(i+1) \bmod 3}$; $P_-$ is $P_{(i-1) \bmod 3}$; a and b are arbitrary values; $a_0$, $a_1$, and $a_2$ are subshares of a satisfying $a = a_0 + a_1 + a_2$; and $b_0$, $b_1$, and $b_2$ are subshares of b satisfying $b = b_0 + b_1 + b_2$, subshares $a_+ \in \{a_0, a_1, a_2\}$ and $b_+ \in \{b_0, b_1, b_2\}$ stored on a secure computation apparatus $P_+$, and subshares $a_- \in A_-$ and $b_- \in B_-$ stored on a secure computation apparatus $P_-$ are stored in a storage of a secure computation apparatus $P_i$, where $A_-$ is a complement of $a_+$ in $\{a_0, a_1, a_2\}$ and $B_-$ is a complement of $b_+$ in $\{b_0, b_1, b_2\}$, and the secure computation method includes a step of sharing, by a sharing unit of the secure computation apparatus $P_i$, an arbitrary value $r_+$ with the secure computation apparatus $P_+$ and sharing an arbitrary value $r_-$ with the secure computation apparatus $P_-$, wherein $r_+ \in F$ and $r_- \in F$, a step of calculating $c_+ = (a_+ + a_-)(b_+ + b_-) - a_- b_- + r_+ - r_-$ by an arithmetic unit of the secure computation apparatus $P_i$, wherein $c_+ \in \{c_0, c_1, c_2\}$, and $c_0 + c_1 + c_2 = a*b$, and a step of outputting $c_+$ to the secure computation apparatus $P_+$ by an output unit of the secure computation apparatus $P_{i+}$, which results in an exchange process of secure computation apparatus $P_0$ calculating $c_1$ and transmitting $c_1$ to secure computation apparatus $P_1$, secure computation apparatus $P_1$ calculating $c_2$ and transmitting $c_2$ to secure computation apparatus $P_2$, and secure computation apparatus $P_2$ calculating $c_0$ and transmitting $c_0$ to secure computation apparatus $P_0$, wherein after the exchange process, each of $P_0$, $P_1$, and $P_2$ store a different pair of values among $c_0$, $c_1$, $c_2$.

8. A secure computation method, implemented by a secure computation apparatus, wherein the secure computation apparatus is one of a plurality of secure computation apparatuses $P_0$, $P_1$, and $P_2$, each of the secure computation apparatuses comprising processing circuitry configured to receive, over a network, an input of one or more respective subshares of data a(n) and b(n), wherein the data a(n) and b(n) is concealed from each of the secure computation apparatuses;

$i \in \{0, 1, 2\}$ holds; P is $P_{(i+1) \bmod 3}$; $P_-$ is $P_{(i-1) \bmod 3}$; a(n) and b(n) are arbitrary values; $a_0(n)$, $a_1(n)$, and $a_2(n)$ are subshares of a(n) satisfying $a(n) = a_0(n) + a_1(n) + a_2(n)$; and $b_0(n)$, $b_1(n)$, and $b_2(n)$ are subshares of b(n) satisfying $b(n) = b_0(n) + b_1(n) + b_2(n)$, subshares $a_+(n) \in \{a_0(n), a_1(n), a_2(n)\}$ and $b_+(n) \in \{b_0(n), b_1(n), b_2(n)\}$ stored on a secure computation apparatus $P_+$, and subshares $a_-(n) \in A_-(n)$ and $b_-(n) \in B_-(n)$ stored on a secure computation apparatus $P_-$ are stored in a storage of a secure computation apparatus $P_i$, where $A_-(n)$ is a complement of $a_+(n)$ in $\{a_0(n), a_1(n), a_2(n)\}$ and $B_-(n)$ is a complement of $b_+(n)$ in $\{b_0(n), b_1(n), b_2(n)\}$, and the secure computation method includes a step of sharing, by a sharing unit of the secure computation apparatus $P_i$, an arbitrary value $r_+$ with the secure computation apparatus $P_+$ and sharing an arbitrary value $r_-$ with the secure computation apparatus $P_-$, wherein $r_+ \in F$ and $r_- \in F$, a step of calculating, by an arithmetic unit of the secure computation apparatus $P_i$:

$$c_+ = \sum_{n=0}^{N-1} \{(a_+(n) + a_-(n))(b_+(n) + b_-(n)) - a_-(n)b_-(n) + r_+ - r_-\},$$

wherein $c_+ \in \{c_0, c_1, c_2\}$, and $c_0 + c_1 + c_2 = a(0)b(0) + \ldots + a(N-1)b(N-1)$, and a step of outputting to the secure computation apparatus $P_+$ by an output unit of the secure computation apparatus $P_i$, which results in an exchange process of secure computation apparatus $P_0$ calculating $c_1$ and transmitting $c_1$ to secure computation apparatus $P_1$, secure computation apparatus $P_1$ calculating $c_2$ and transmitting $c_2$ to secure computation apparatus $P_2$, and secure computation apparatus $P_2$ calculating $c_0$ and transmitting $c_0$ to secure computation apparatus $P_0$, wherein after the exchange process, each of $P_0$, $P_1$, and $P_2$ store a different pair of values among $c_0$, $c_1$, $c_2$.

\* \* \* \* \*